United States Patent
Boisseau

(10) Patent No.: US 6,357,835 B1
(45) Date of Patent: Mar. 19, 2002

(54) BRAKING DEVICE WITH COMBINED POWER-ASSISTANCE AND CONTROL

(75) Inventor: Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,560

(22) PCT Filed: Aug. 19, 1999

(86) PCT No.: PCT/FR99/02011

§ 371 Date: Sep. 2, 1999

§ 102(e) Date: Sep. 2, 1999

(87) PCT Pub. No.: WO00/12366

PCT Pub. Date: Mar. 9, 2000

(30) Foreign Application Priority Data

Aug. 28, 1998 (FR) .......................................... 98 10798

(51) Int. Cl.⁷ ................................................ B60T 8/42
(52) U.S. Cl. ................................. 303/113.5; 303/115.2
(58) Field of Search ...................... 303/113.4, 115.2, 303/116.2, 116.1, 113.5, 163, 164, 10, 11, 113.1

(56) References Cited

U.S. PATENT DOCUMENTS

| | | | | |
|---|---|---|---|---|
| 5,152,585 A | * | 10/1992 | Patient et al. | ................. 303/10 |
| 5,758,930 A | * | 6/1998 | Schiel et al. | ............. 303/113.4 |
| 5,927,825 A | * | 7/1999 | Schenk et al. | ........... 303/115.2 |

* cited by examiner

Primary Examiner—Matthew C. Graham
(74) Attorney, Agent, or Firm—Leo H. McCormick, Jr.; Warren Comstock

(57) ABSTRACT

A braking device for a vehicle having rear and front pressure receivers (21, 22) connected with a mechanical pressure generator (31) and an electrical pressure generators (31, 32) and selectively controlled by solenoid valves (61, 62, 63). An inlet (222) of the front pressure receiver (22) is connected directly to an outlet (324) of the electrically controlled pressure generator (32) while a solenoid valve (61) selectively connects an outlet (313) of the mechanically controlled pressure generator (31) to the inlet (222) of the front pressure receiver (22) to control braking. The fluid pressure communicated from the electrically controlled pressure generator (32) being selectively altered to create a desired braking for the vehicle.

7 Claims, 2 Drawing Sheets

BRAKING DEVICE WITH COMBINED POWER-ASSISTANCE AND CONTROL

The present invention relates to a braking device for a motor vehicle, of the type which make it possible to prevent the wheels of this vehicle from locking.

BACKGROUND OF THE INVENTION

More specifically, the present invention relates to a vehicle braking device of the type comprising a closed hydraulic circuit filled with a hydraulic fluid selectively subjected to various pressures at various points in the circuit, this circuit comprising: a low-pressure reservoir; a first pressure receiver associated with one rear wheel of the vehicle and one inlet of which constitutes a first point of the circuit; a second pressure receiver associated with one front wheel of the vehicle and one inlet of which constitutes a second point of the circuit; a first pressure generator controlled mechanically and one outlet of which constitutes a third point of the circuit; a second pressure generator controlled electrically and one outlet of which constitutes a fourth point of the circuit; a hydraulic-fluid accumulator; a pressure sensor capable of providing a measurement of the pressure of the fluid at the third point of the circuit; and valve means.

Devices of this type are well known in the prior art and have been used for many years.

One of the problems encountered in designing such braking systems lies in the difficulty of constantly improving the performance while at the same time reducing the cost, particularly to allow their use to be as widespread as possible and thus provide optimum safety on the greatest possible number of vehicles.

SUMMARY OF THE INVENTION

The present-invention falls within this context and is aimed in particular at allowing an appreciable reduction in the cost of manufacture of devices of this type by optimizing their functions.

To this end, the device of the invention, which in other respects is in accordance with the definition given in the above preamble, is essentially characterized in that the second and fourth points of the circuit are connected to each other so as to be permanently subjected to the same pressure, in that the valve means comprise a first solenoid valve operated to move from an open state in which it connects the second and third points of the circuit to each other, into a closed state in which it isolates the second and third points of the circuit from each other in response to the pressure measurement crossing a predetermined threshold, and in that the pressure delivered by the second pressure generator can be altered electrically.

As a preference, the accumulator has an inlet connected directly to the third point of the circuit and this accumulator is preset to allow hydraulic fluid in only when the fluid pressure at the third point of the circuit is at least equal to three quarters of the said predetermined threshold value.

In a braking device in which a first absorption law connects each variation in volume of fluid let into the accumulator with a corresponding variation in the pressure of the fluid at the third point of the circuit, in which a second absorption law connects each variation in volume of fluid let into the second pressure receiver with a corresponding variation in the fluid pressure at the fourth point of the circuit, and in which the first and second absorption laws have first and second respective gradients, these first and second gradients are advantageously in a ratio of between 0.75 and 1.33.

To further optimize the braking device of the invention, it is preferable to ensure that the valve means further comprise a second solenoid valve selectively connecting the first and third points of the circuit, and a third solenoid valve selectively connecting the first point of the circuit to the low-pressure reservoir, the second and third solenoid valves allowing the pressure in the first pressure receiver to be altered selectively.

In the conventional way, the first pressure generator may comprise a master cylinder which may or may not be associated with a vacuum booster.

The second pressure generator, for its part, may comprise a piston mounted so that it can slide in leaktight fashion in a cylinder and be selectively moved by an electric motor.

By virtue of these features, the device of the invention can combine the advantages of variable boosting on each front wheel of the vehicle with the advantages of anti-lock regulation on each rear wheel, without having to resort to the use of a pump.

It is thus possible, in particular:

to respond to emergency braking situations with variable boosting on each front wheel;

to maintain and/or improve the response times of the braking device by virtue of the direct connection between the master cylinder and each pressure receiver in the initial phase of a braking sequence;

to retain the conventional pedal feel, the conventional dead travel and the conventional triggering threshold of a standard braking device, by fitting the device of the invention with a small-size vacuum booster;

to control manufacturing costs by simplifying the anti-lock function for the wheels on the rear axle of the vehicle;

and to obtain improved safety by using two sources of energy, namely muscular energy and electrical energy and by duplicating the pressure generators that control the front pressure receivers.

Other features and advantages of the invention will emerge clearly from the description thereof given hereafter by way of non-limiting indication with reference to the appended drawings.

DETAILED DESCRIPTION OF THE INVENTION

Figure 1:
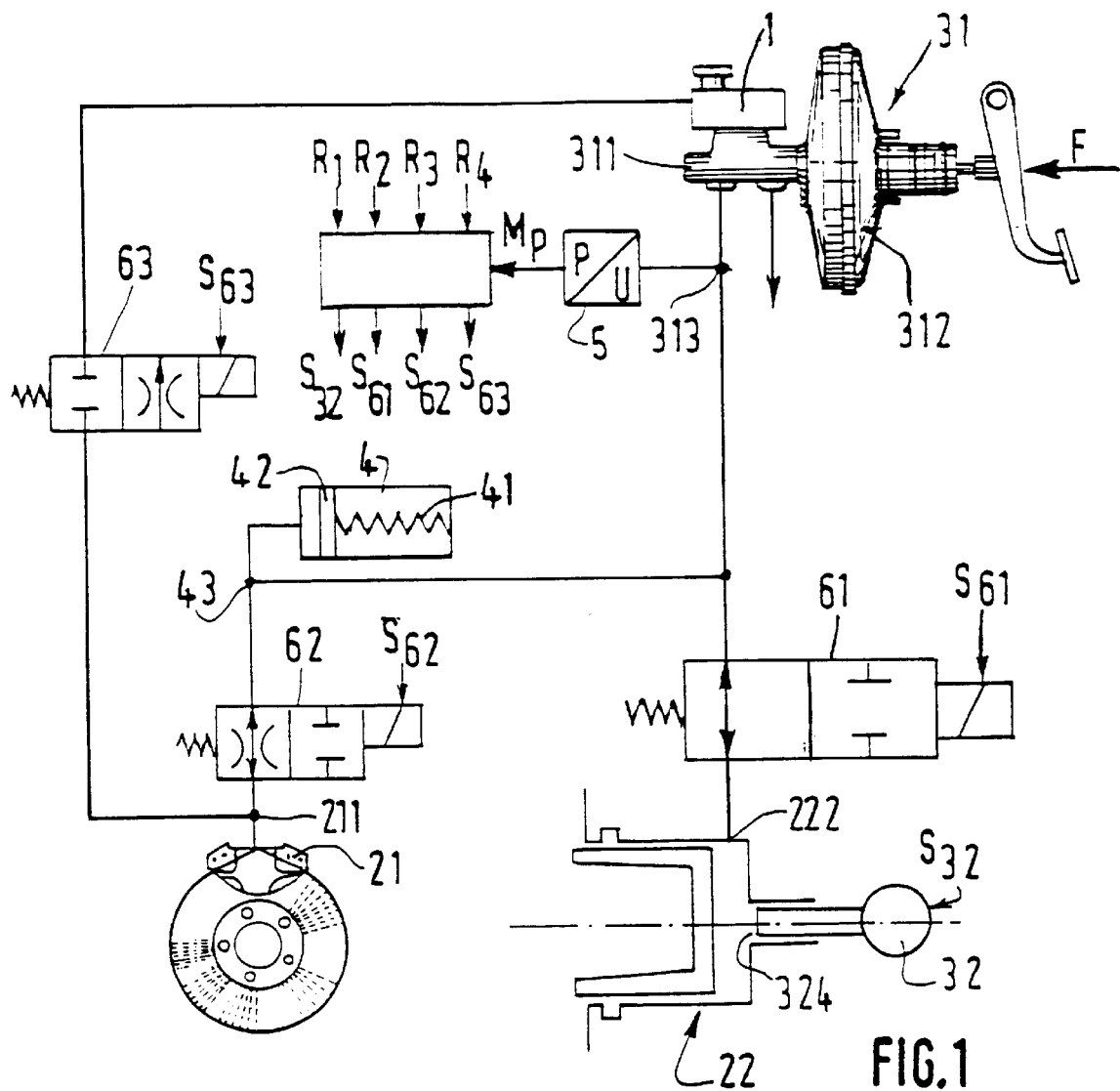
FIG. 1 is the schematic diagram of a braking device in accordance with the invention.

The invention relates to a braking device for a motor vehicle that makes it possible to prevent the wheels of this vehicle from locking.

More specifically, the invention relates to a braking device for a vehicle of the type comprising a closed hydraulic circuit filled with a hydraulic fluid selectively subjected to various pressures at various points in the circuit.

Such a circuit conventionally comprises: a low-pressure reservoir 1; pressure receivers such as 21, 22 associated respectively with the rear and front wheels of the vehicle and each of which is capable of applying to the corresponding wheel a braking torque that depends on the pressure it receives; a pressure generator 31 controlled mechanically by the muscular work exerted by the driver of the vehicle; an electrically controlled pressure generator 32; a pressure sensor 5 supplying a pressure measurement signal Mp; and solenoid valves such as 61, 62 and 63.

Wheel sensors (not depicted) supply a logic unit 7 with signals R1, R2, R3 and R4, each of which represents the rotational movement of the corresponding wheel of the vehicle, the logic unit also receiving the pressure measurement signal Mp and delivering control signals S32, S61, S62 and S63 intended for the pressure generator 32 and the solenoid valves 61, 62 and 63.

Any reader not familiar with the technique concerned may advantageously refer to the technical work by the applicant entitled "Dispositifs de freinage pour voitures [Braking devices for cars]" and published by Delta Press, 35, Rue Sainte-Cécile, 13005—Marseilles, France.

A first point of the hydraulic braking circuit consists of an inlet 211 of the first pressure receiver 21; a second point of this circuit consists of an inlet 222 of the second pressure receiver 22; a third point consists of an outlet 313 of the mechanically controlled pressure generator 31; and a fourth point of this same circuit consists of an outlet 324 of the electrically controlled pressure generator 32.

The pressure sensor 5 is installed directly at the third point 313 of the circuit so that it can supply, by way of signal Mp, a measurement that represents the fluid pressure at this third point 313.

According to a first aspect of the invention, the second and fourth points 222, 324 of the circuit are connected directly to each other so as to be permanently subjected to the same pressure.

At rest, that is to say when the braking device is not being actuated, the solenoid valve 61 which is installed between the second and third points 222, 313 of the circuit is in an open state as illustrated in FIG. 1 and in which it causes these second and third points 222, 313 of the circuit to communicate with each other.

When the pressure measurement Mp crosses a predetermined threshold Sp, this crossing is detected by the logic unit 7 which immediately makes the solenoid valve 61 switch into a closed state, in which this solenoid valve isolates the second and third points 222, 313 of the circuit from each other.

The second pressure generator 32 is incidentally of the type which deliver an electrically alterable pressure.

This being the case, it is possible, as soon as the driver has applied a pressure equal to the threshold Sp, to use electrical energy to intensify the braking effort without the driver being required to supply additional muscular effort of which he may not be capable.

According to a second aspect of the invention, the accumulator 4 has an inlet 43 connected directly to the third point 313 of the circuit, and this accumulator 4 is preset to allow hydraulic fluid in only when the fluid pressure at the third point 313 of the circuit is at least equal to three quarters of the predetermined threshold value Sp and, more advantageously still, when it is equal to this threshold value Sp.

To this end, the accumulator 4 may comprise a spring 41 which pushes back a piston 42 and which is compressed when the piston is displaced by the fluid entering the accumulator, the spring 41 being preloaded so that it allows fluid in only above the desired pressure.

By virtue of this arrangement, not only is it possible to use the accumulator to simulate the actuation of the second pressure receiver 22, as if the solenoid valve 61 had remained open, but it is also possible to store up in the accumulator 4 a certain volume of fluid under pressure that can be used to perform pump-free anti-lock regulation in the first pressure receiver 21.

To do this, the first absorption law, defined as being the law which connects each variation in volume V1 of fluid let into the accumulator 4 with a corresponding variation in the pressure P1 of the fluid at the third point 313 of the circuit, needs to be made to coincide, at least approximately, for pressure values above the threshold value Sp, with the second absorption law, defined as being the law which connects each variation in volume V2 of fluid let into the second pressure receiver 22 with a corresponding variation in the fluid pressure P2 at the fourth point 324 of the circuit.

Figure 2:
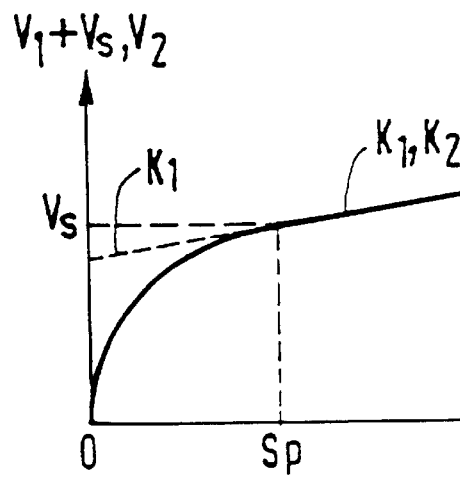
FIG. 2 is a diagram depicting the absorption laws of the accumulator and of the pressure receiver of the front wheel.

In reality, as shown in FIG. 2, the second absorption law first of all displays a non-linear change which corresponds to compensation for play and which is followed by a linear change defined by a gradient K2 corresponding to the elastic deformation of the brake actuated by the pressure receiver 22.

The first absorption law is a linear law of gradient K1 where K1 is the stiffness of the spring 41, the pressure origin P1 of which is located at the threshold value Sp, and whose origin, measured in terms of volume V2, is denoted Vs, and whose origin, measured in terms of volume V1, is zero because the volume V1 of fluid let into the accumulator does not start to increase until the pressure values exceed the threshold value Sp.

This being the case, the filling of the accumulator 4 may provide optimum simulation of the actuation of the pressure receiver 22 provided that the threshold Sp is chosen to lie on the linear part of the second absorption law and provided that the spring 41 is chosen to have a stiffness K1 that is the value of the gradient K2 of this second absorption law, this simulation remaining applicable so long as the ratio K1/K2 remains between 0.75 and 1.33.

As the accumulator 4 constitutes a reserve of pressurized fluid available to the first pressure receiver 21, it is possible to alter the pressure prevailing in this first pressure receiver without having to resort to the use of a pump.

To achieve this, all that is required, as shown in FIG. 1, is to provide a second solenoid valve 62 installed between the first and third points 211, 313 of the circuit, and a third solenoid valve 63 installed between the first point 211 of the circuit and the low-pressure reservoir 1, these second and third solenoid valves 62, 63 being controlled by the logic unit 7 to allow selective alteration of the pressure in the first pressure receiver 21, particularly to prevent the corresponding rear wheel from locking.

As FIG. 1 shows, the first pressure generator 31 may comprise a master cylinder 311 which may or may not be fitted with a vacuum booster 312.

Figure 3:
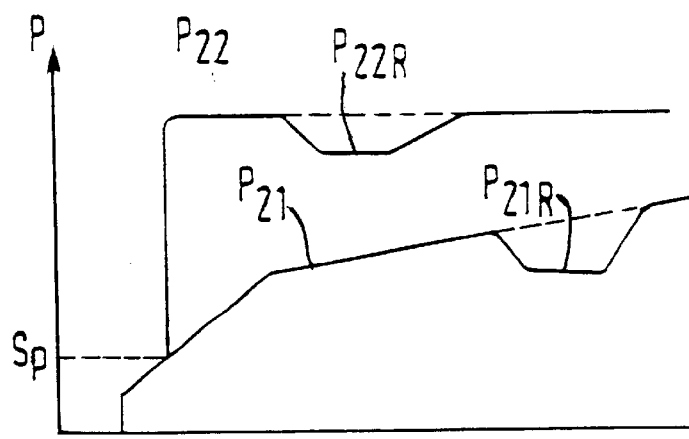
FIG. 3 is a diagram depicting, as a function of the braking force exerted by the driver of the vehicle, the change in hydraulic-fluid pressures in the front and rear receivers for a braking device in accordance with the invention which is equipped with a brake-boosting vacuum booster.

FIG. 3 is a diagram which depicts, as a function of the braking force F exerted by the driver of the vehicle, the change in pressures P22 and P21 in the front 22 and rear 21 receivers in the event that a vacuum booster 312 is used.

The pressure P21 in the rear pressure receiver 21 changes as a function of the force F following the response curve that is characteristic of the booster, except, for example, if this pressure has to be regulated by the switching of the solenoid valves 62 and 63 in order temporarily to prevent the corresponding rear wheel from locking, this situation being illustrated by the pressure change P21R. As the pressure P22 in the front pressure receiver 22 is, up to its threshold value Sp, generated by the mechanically controlled pressure generator 31 it, in the absence of any regulation, follows the same change as the pressure P21.

Figure 4:
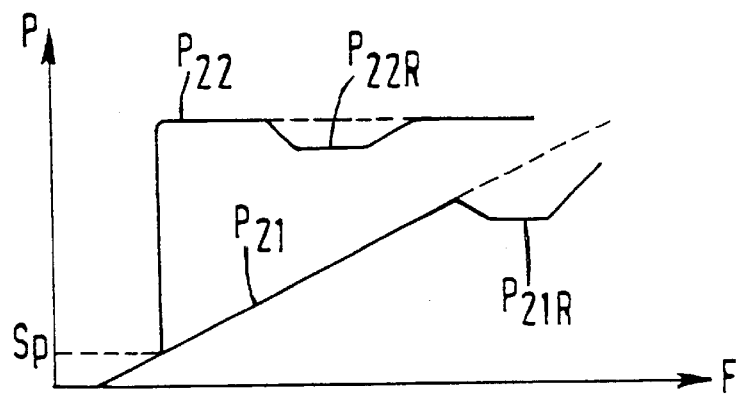
FIG. 4 is a diagram depicting, as a function of the braking force exerted by the driver of the vehicle, the change in hydraulic-fluid pressures in the front and rear receivers for a braking device in accordance with the invention which is not equipped with a brake-boosting vacuum booster.

By contrast, in so far as, beyond the threshold value Sp, the pressure P22 is generated by the electrically controlled pressure generator 32, this pressure P22 can both significantly exceed the pressure that the driver's effort causes to appear at the third point 313 of the circuit, and change independently of the pressure available at the third point 313, it being possible for the pressure P22 itself to be altered by electric control of the pressure generator 32, for example to temporarily prevent the corresponding front wheel from locking, as shown by the change P22R in this pressure.

Where no booster is used (FIG. 4) the situation is similar, except that the pressure P21 changes according to the response curve that is characteristic of a master cylinder with no boosting.

Figure 5:
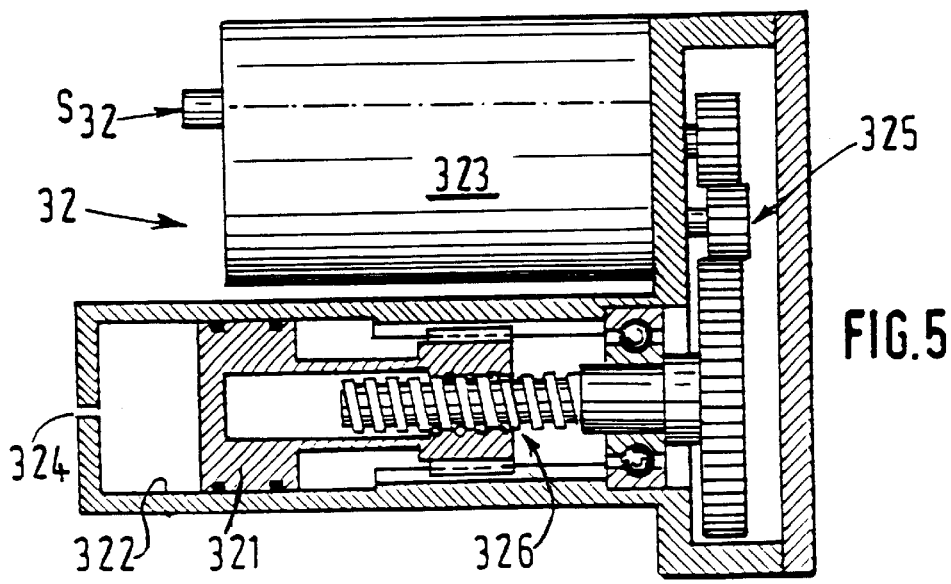
FIG. 5 illustrates one possible embodiment of the second pressure generator.

As FIG. 5 shows, the electrically controlled pressure generator 32 advantageously comprises a piston 321 mounted so that it can slide in leaktight fashion in a cylinder 322 and be selectively moved by an electric motor 323, for example via a set of reduction gears 325 and a screw-nut connection 326, although a piezoelectric pressure generator could be used instead of the generator illustrated.

I claim:

1. A vehicle braking device having a closed hydraulic circuit filled with a hydraulic fluid selectively subjected to various pressures at various points in the circuit, said hydraulic circuit comprising:
   a low-pressure reservoir;
   a first pressure receiver associated with one rear wheel of the vehicle and a first inlet which defines a first point in said circuit;
   a second pressure receiver associated with one front wheel of the vehicle and a second inlet which defines a second point in said circuit;
   a first pressure generator controlled mechanically and a first outlet which defines a third point in said circuit;
   a second pressure generator controlled electrically and a second outlet which defines a fourth point in said circuit;
   a hydraulic fluid accumulator;
   a pressure sensor capable of providing a measurement of a pressure of fluid at said third point in the circuit; and valve means characterized in that said second and fourth points in said circuit are connected to each other and permanently subjected to a same fluid pressure, said valve means including a first solenoid valve operated to move from an open state in which said second and third points in said circuit are connected to each other to a closed state in which said second and third points in said circuit are isolated from each other in response to said pressure measurement crossing a predetermined threshold, said circuit including means for electrically modulating said second pressure generator.

2. The braking device according to claim 1, characterized in that said accumulator has an inlet connected directly to said third point in said circuit and said accumulator is preset to only receive hydraulic fluid when the fluid pressure at said third point in said circuit is at least equal to three quarters of the said predetermined threshold value.

3. The braking device according to claim 2, wherein a first absorption law controls each variation in a first volume of fluid let into the accumulator as a function in a corresponding variation in the pressure the fluid at said third point in said circuit, and a second absorption law controls each variation in a second volume of fluid let into a second pressure receiver as a function in a corresponding variation in the fluid pressure at said fourth point in said circuit, said first and second absorption laws each having first and second respective gradients, said first and second gradients having a ratio of between 0.75 and 1.33.

4. The braking device according to claim 1, characterized in that said valve means further comprise a second solenoid valve selectively connecting said first and third points in said circuit, and a third solenoid valve selectively connecting said first point in said circuit to said low-pressure reservoir, said second and third solenoid valves allowing pressure in said first pressure receiver to be altered selectively.

5. The braking device according to claim 1, characterized in that said first pressure generator comprises a master cylinder.

6. The braking device according to claim 1, characterized in that said first pressure generator comprises a vacuum booster.

7. The braking device according to claim 1, characterized in that said second pressure generator comprises a piston mounted to slide in leaktight fashion in a cylinder and is selectively moved by an electric motor.

* * * * *